No. 738,725. PATENTED SEPT. 8, 1903.
S. LAKE.
SYSTEM OF SUBMARINE COMMUNICATION.
APPLICATION FILED JUNE 23, 1902.
NO MODEL. 3 SHEETS—SHEET 2.
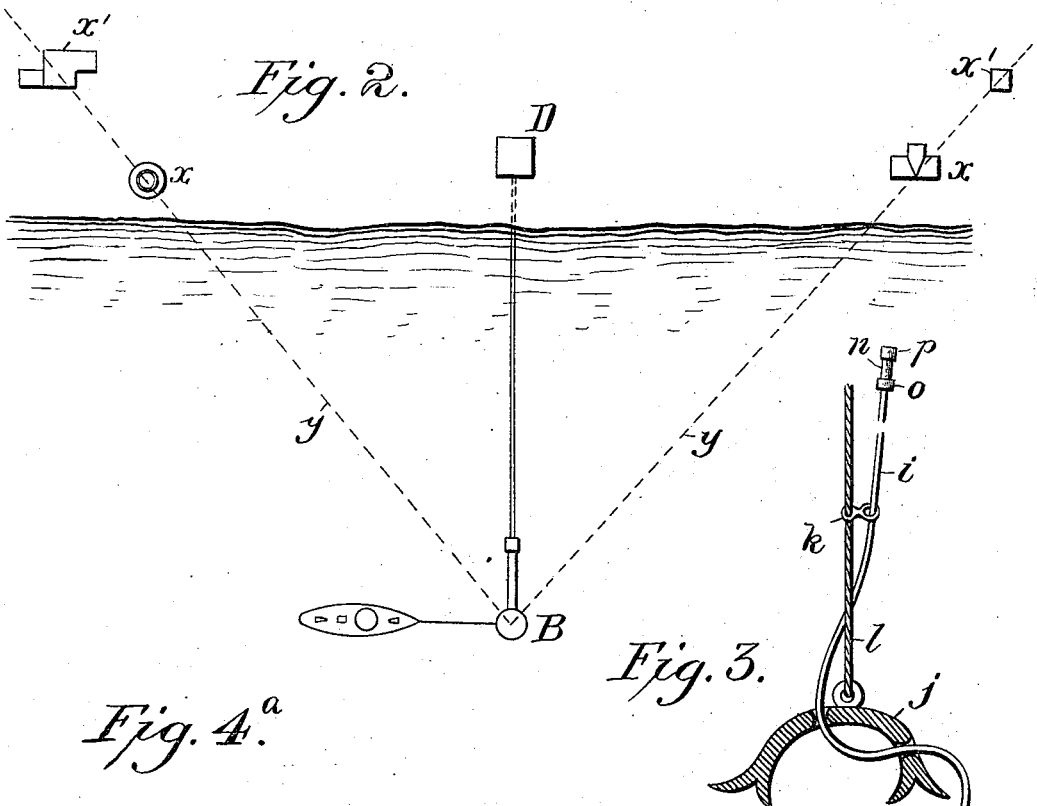
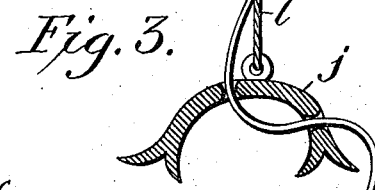
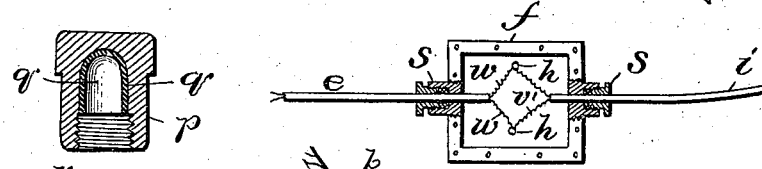
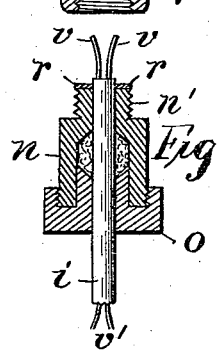
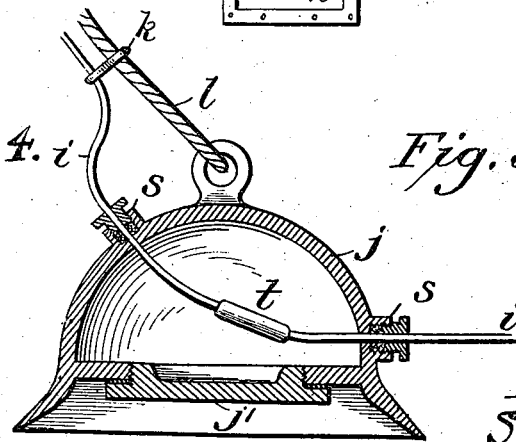
Witnesses:
J. B. McGirr.
H. A. Kornemann.
Inventor:
Simon Lake,
By Henry J. Miller,
Atty.

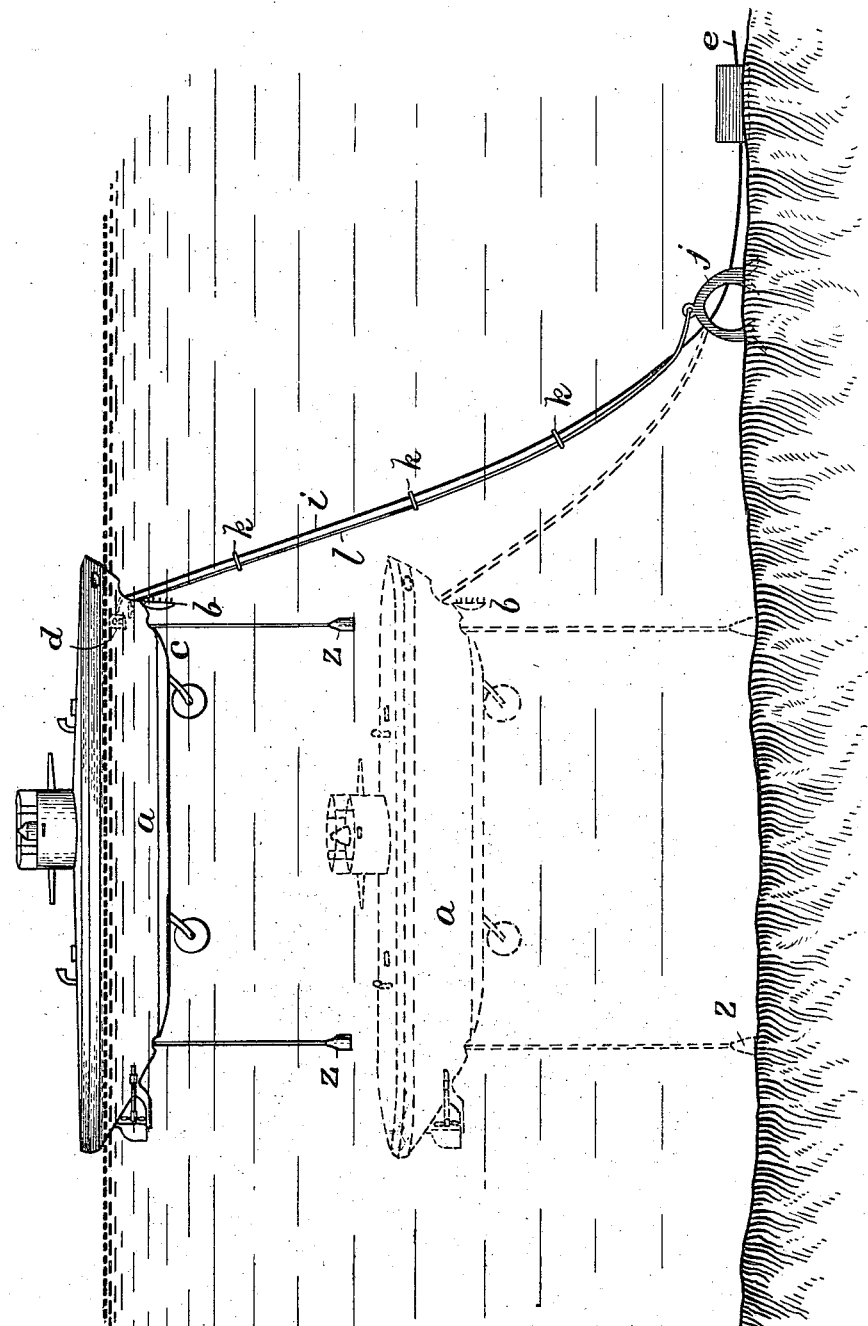

No. 738,725. PATENTED SEPT. 8, 1903.
S. LAKE.
SYSTEM OF SUBMARINE COMMUNICATION.
APPLICATION FILED JUNE 23, 1902.
NO MODEL. 3 SHEETS—SHEET 3.
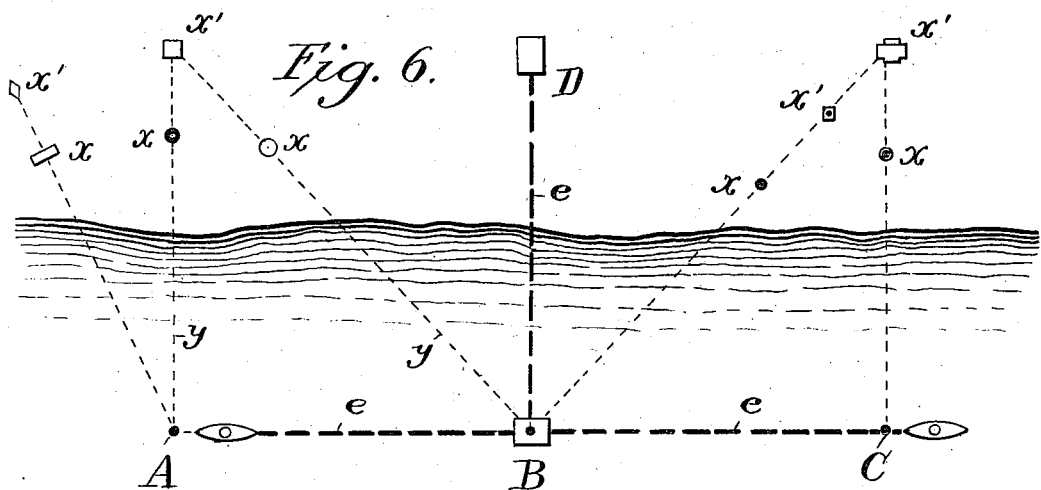
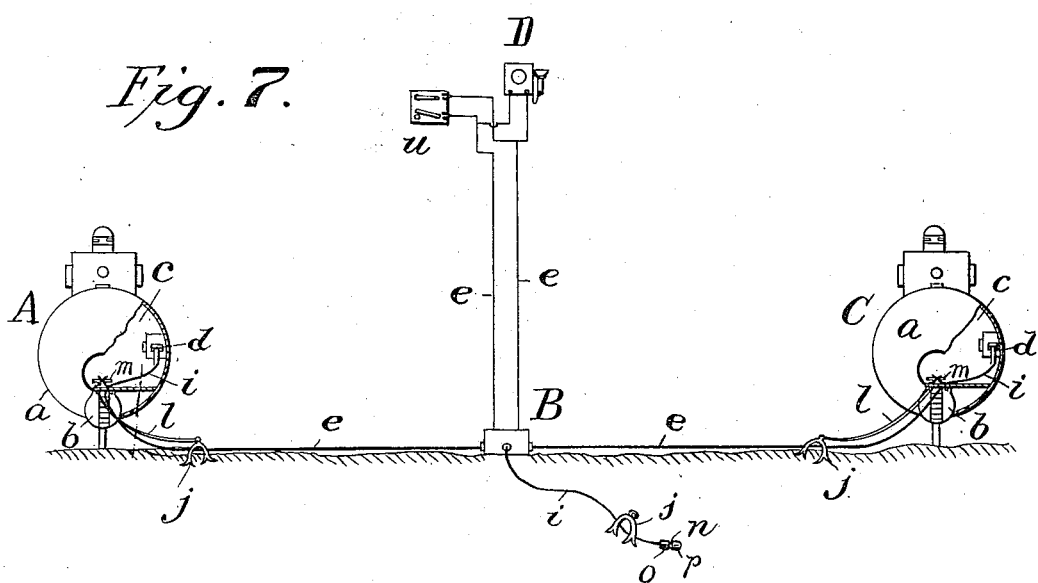
Witnesses:
J. B. McGirr.
H. A. Kornemann.
Inventor
Simon Lake,
By Henry J. Miller,
Atty.

No. 738,725.                                     Patented September 8, 1903.

UNITED STATES PATENT OFFICE.

SIMON LAKE, OF BRIDGEPORT, CONNECTICUT.

SYSTEM OF SUBMARINE COMMUNICATION.

SPECIFICATION forming part of Letters Patent No. 738,725, dated September 8, 1903.

Application filed June 23, 1902. Serial No. 112,822. (No model.)

*To all whom it may concern:*

Be it known that I, SIMON LAKE, a citizen of the United States, residing at Bridgeport, in the county of Fairfield and State of Connecticut, have invented a new and useful Improvement in Systems of Submarine Communication, of which the following is a specification.

This invention has for its primary object to provide a wholly-concealed means of submarine communication whereby in time of war the officers of a boat on picket duty at or near one station may have easy communication with those at another distant station or stations either upon land or water in order to apprise those at such station or stations at a distant point of the movements of an enemy's ship or fleet sighted by such picket-boat.

The improvement is designed for use more particularly with submarine boats adapted to descend beneath the surface of the water and to rest and travel upon the water-bed, as set forth and described in the United States Patent No. 650,758, granted to me May 29, 1900, but is well adapted for use in connection with surface vessels, as will be obvious from the following description of its nature and mode of use.

The invention consists, essentially, in a submerged station disposed remotely from stationary or permanent objects above the surface of the water, but in known relation to two or more such objects, and a station or stations located at a distance therefrom, either submerged or disposed above the level of the water at some suitable point or points, and a line of communication intermediate said station consisting, preferably, of a cable composed of one or more electrical conducting-wires and means connected with said line or cable at two or more of said stations and adapted for temporary connection with boats at such stations. When the system is employed for signaling between the several stations and an electrical conducting-cable is used to connect the stations, the submerged station or stations are designed to have telegraph instruments or telephones, which may be temporarily put in the circuit for use only while the picket-boat is at such station; but at the land station or stations or those above the water-level the telegraph instrument or telephone may be and preferably is connected permanently with the terminal or terminals of the line conductor and may be also provided with a switchboard, so as to adapt it for a central station for establishing communication with other individual stations in lieu of a permanent connection between the several stations of the system. The use of a switchboard for controlling the connection with the several stations also applies equally when the point at which it is located is employed as the central station of a power system.

The invention further includes certain specific apparatus for carrying the general scheme of the invention into effect.

In the annexed drawings, Figure 1 is an elevational view showing in full lines a submarine boat upon the surface of the water with the terminal of the adjacent submerged station led up into its diver's compartment or chamber for connection with a telephone therein and showing in dotted lines such boat anchored beneath the surface of the water and out of sight of passing surface vessels. Fig. 2 is a diagrammatic plan view of a vessel in communication with a shore station of the system. Fig. 3 is a sectional elevation of a permanent anchor and an electric-cable junction-box suitable for use at a submerged station, showing a branch or terminal portion of the electric cable led through apertures in the anchor and bound to the anchor-cable for the support and protection of the same from injury when attached to a vessel at the station. Figs. 4 and 4ª are sectional elevations, respectively, of the end of a branch or terminal portion of the cable and the cap for sealing the same from the penetration of water when not in use. Fig. 5 is a detail sectional elevation of a modification of the anchor. Fig. 6 is a diagrammatic plan view showing a series of submerged stations in communication with a shore station and embodying the present invention, and Fig. 7 is a similar view showing in front elevation (partly broken away to expose the contained telephones) two submarine boats at distant stations in communication each with the other through an intermediate submerged station and a shore station.

The submarine boat *a* illustrated in the drawings belongs to that type adapted to descend to and travel upon the water-bed and is provided with a bottom door $b$ to the diver's compartment $c$, containing a telephone $d$.

An end of the conductor-cable $e$, constituting the main line of communication, is led at each submerged station through a stuffing-box $s$ into a junction-box $f$, sealed from the external water and having binding-posts $h$, to which the ends of the component wires $w$ of the cable are led and by means of which they are connected with the ends of the component wires $v$ of the flexible branch cable or terminal $i$, which is led outwardly from the junction-box through a second stuffing-box $s$ and passes through apertures in the anchor $j$, to which it is bound at intervals by rings or straps $k$ to the anchor-cable $l$, the compound cable thus formed being led upwardly into the diver's compartment $c$ of the boat, where the ends of the wires $v$ are connected to the telephone $d$, while the anchor-cable $l$ is made fast to a cleat $m$ or other suitable fastening device in the diver's compartment or upon the exterior of the boat, the terminal portion $i$ of the conductor-cable and the anchor-cable $l$ being made of suitable length for connection with and for mooring the boat, respectively, even in case the latter should rise to or remain at the surface while establishing communication with a distant station with which the cable $e$ is connected.

In order to protect the ends of the cable terminal wires $v$ from the penetration of water, which would cause a short circuit with its attendant injury, the end of the insulating-covering of each terminal cable is provided with a stuffing-box comprising two threaded and intermeshing centrally-perforated and recessed portions $n$ and $o$, the former having a reduced externally-threaded boss $n'$ at the end adjacent the bare extremities of the conductor-wires $v$, to which is applied the removable cap $p$, the open end of which is formed with an internally-threaded socket to fit the reduced externally-threaded boss $n'$ of the stuffing-box section $n$ and the closed inner end of which cap is provided with an insulating-lining $q$ to prevent any metallic contact between the cap and the inclosed ends of the conductor-wires $v$. To insure a water-tight joint between the stuffing-box section $n$ and the cap $p$, a washer $r$, preferably of yielding waterproof material, such as india-rubber, is inserted between the end of the latter and an opposed shoulder upon the former, which serves effectively as a packing to seal the joint.

In lieu of the preferred form of junction-box and independent anchor represented in Fig. 3, which is suitable for an intermediate station in that the junction-box may be readily fitted to connect adjacent sections of a main line of communication and branch and terminal cables, such members may be combined in a single anchor $j$, having a closed water-tight chamber with cover-plate $j'$ surrounding the splice $t$ or any other form of joint between the end of the main cable $e$ and terminal cable $i$, both led into the anchor-chamber through a stuffing-box $s$, as shown in Fig. 5.

Each of the submerged stations, as A B C, is located in a known position, which may be accurately determined by its angular relation with various stationary and permanent objects, preferably upon the shore—such as buildings, trees, or rocks $x x'$—the location of such stations being discoverable by merely determining the intersection of lines passing through the relative specified objects for the bearings of the given station, as indicated by the dotted lines $y y$ in Figs. 2 and 6. As the bearings of the submerged and concealed stations at A, B, and C to the stationary or permanent objects by which their precise location is to be ascertained may also be determined with reference to the points of the compass, as indicated by the dotted lines $y$ in Figs. 2 and 6, it is evident that such stations may be located accurately by the use of compasses upon vessels visiting such stations when only two of said stationary objects are charted from which to determine the position of each of said concealed stations.

The shore stations D are preferably provided each with a permanently-connected telephone or telegraph instrument and may have also a central-station switchboard $u$, as indicated in Fig. 7, to which individual cables from the several stations of the system may be led, intercommunication between such stations being readily established through the switchboard, if desired.

In the use of the system upon sighting an enemy the picket-boat first moves to the submerged signal-station nearest at hand, picks up the free end of the cable $i$ and connects it with its telephone or telegraph instrument, and establishes communication with the central station or that nearest the enemy, (in case there should be one located nearer to the latter's course of travel,) making known at such station the necessary intelligence of its own as well as the enemy's movements or proposed movements and at the same time receiving such instructions as may be proper or necessary under the circumstances. If such picket-boat be of the surface type, the end of the cable-terminal $i$ may be readily secured by grappling; but a submarine picket-boat, such as that hereinbefore mentioned, will be preferably submerged to the water-bed, where it may rest after picking up the cable $j$ and connecting the terminal wires $v$ with its telephone $d$ during the transmission of messages to and from the distant station or stations, or such boat may be permitted to ride above the water-bed and anchored by means of the weights $z$ and their suspending-lines at a point near the surface, while still invisible from surface boats, as indicated in dotted lines in Fig. 1, or may be permitted to rise to the surface, where it may be moored by the use of the weights $z$ or by means of the anchor-cable $l$ in full view of what may be transpiring upon the surface, as circumstances may require.

Although I consider it desirable to provide a loose branch or terminal $i$ in electrical connection with the line-cable $e$ for convenient connection with a suitable electrical instrument or apparatus carried by the picket-boat to be brought into communication with another station or stations of the system, it is evident that other means of connection between the boat and the line of communication could be readily used in lieu thereof for signaling and other purposes and that other mediums or means of communication than the electric current might be employed under certain conditions to establish communication throughout the system, for which reason it is to be understood that the present invention is wholly independent in its broadest aspect of the specific means employed for carrying it into effect, the essential feature of the improvement being obviously the series of intercommunicating stations of known and readily-determinable location, one or more of which are submerged beneath the surface of the water, so as to be wholly invisible to passing vessels, and provided with means for their operative connection with vessels furnished with charts or other data from which to determine the location of said submerged station or stations.

From the foregoing description it will be understood that the essential feature of the present invention is the submerged station located remotely from all fixed or permanent objects above the surface of the water, so as to be entirely and effectively concealed from and to offer no means whatever of detection by occupants of passing vessels unprovided with charts disclosing its position, while the known relation of the same to at least two laterally-distant fixed objects enables those having the necessary information to accurately determine its position, such concealed submerged station being in communication with a distant station or stations for the purposes before described. The present improvement therefore differs from other systems of submarine communication in that its submerged stations are not only themselves hidden from the view of occupants of passing surface vessels, but all their permanent connections—such as the line-cable $e$, branch-cables $i$, and anchor-cables $l$—are constructed and adapted to lie normally beneath the surface of the water, and therefore also equally concealed from view, no buoys or other connected means of locating them as heretofore being provided.

Having thus set forth the nature of the invention, what I claim herein is—

1. A system of submarine communication comprising a submerged station located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, a second station located at a distance from the first-named station, and a connecting line of communication intermediate said stations and having the end at said first-named station constructed and adapted for temporary attachment to an instrument or device for establishing operative communication with an instrument or device connected with said line at the other station.

2. A system of submarine communication comprising a series of submerged offshore stations each located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, a shore station, and connecting electrical conductors intermediate said stations, the terminals of said conductors at the submerged stations having means for temporary connection with suitable instruments or devices for establishing operative communication with like instruments at other said connected stations.

3. In combination, a series of stations comprising one or more submerged stations each located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, electrical connections between the stations of said series, electrical instruments or devices at one or more of said stations, a similar electrical instrument or device carried by a submarine boat, and a connection from said last-named instrument or device to said electrical connection at one of said submerged stations.

4. In a system of submarine communication, a submerged station located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, a connecting transmitting-line between said submerged station and a distant station or stations, and a flexible device attached at one end to said line at said submerged station and free at its other end and adapted for temporary attachment with a suitable instrument or device carried by a vessel visiting said submerged station.

5. In a system of submarine communication, a submerged station located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, an electric line-cable leading to said submerged station from a distant station or stations and securely anchored at the said submerged station, and a branch or terminal cable having one end connected to said anchored line-cable and its other end free and adapted for temporary connection with electrical apparatus upon a vessel at said submerged station.

6. In a system of submarine communication, a submerged station located remotely from all fixed or permanent objects above the surface of the water but in known relation to at least two laterally-distant stationary objects by which its position may be determined, all permanent connections to said submerged stations being constructed and adapted to lie normally hidden beneath the surface of the water, an electric line-cable leading to said submerged station from a distant station or stations and securely anchored at the said submerged station, and a flexible branch or terminal cable having one end connected to said anchored line-cable at said submerged station and its other end provided with a removable water-tight cap to exclude water from its core and adapted for temporary connection with electrical apparatus upon a vessel visiting said submerged station.

7. In a system of submarine communication, a submerged station located remotely from all fixed or permanent objects above the surface of the water but in known relation to at least two laterally-distant stationary objects from which its position may be determined, all permanent connections to said submerged stations being constructed and adapted to lie normally hidden beneath the surface of the water, said station having an anchorage to which is led an electric line-cable from a distant station or stations, and a branch or terminal cable having at one end a connection with said line-cable extending from said anchorage and the other end free and adapted to be picked up and connected temporarily with suitable apparatus carried by a vessel at said submerged station, and means for sealing the free end of said branch cable from penetration of water when again disconnected from said apparatus.

8. In a system of submarine communication, a submerged station located remotely from all fixed or permanent objects above the surface of the water but in known relation to at least two laterally-distant stationary objects from which its position may be determined, all permanent connections to said submerged stations being constructed and adapted to lie normally hidden beneath the surface of the water, a line of electrical communication between said station and a distant station or stations terminating in a junction-box at said submerged station, a permanent anchor at said submerged station provided with a cable for mooring vessels, and a branch or terminal connected at one end with said electrical line at said junction-box and extending to and beyond said anchor and having its free end portion secured to and supported by said anchor-cable and provided with a removable cap for sealing its extremity from the water.

9. A system of submarine communication comprising a submerged station accessible to but entirely hidden from occupants of boats cruising upon the surface of the water in its vicinity and located in readily-determinate position by means of its known bearings, all permanent connections to said submerged stations being constructed and adapted to lie normally hidden beneath the surface of the water, a second station located at a distance from the first-named station, and a connecting line of communication intermediate said stations and having the end at said first-named station constructed and adapted for temporary attachment to an instrument or device for establishing operative communication with an instrument or device connected with said line at the other said station.

In testimony whereof I have signed my name to this specification, in the presence of two subscribing witnesses, this 19th day of June, 1902.

SIMON LAKE.

Witnesses:
L. B. MILLER,
H. J. MILLER.